G. R. FOX.
CULTIVATOR.
APPLICATION FILED MAR. 24, 1916.
1,253,480.
Patented Jan. 15, 1918.
2 SHEETS—SHEET 1.
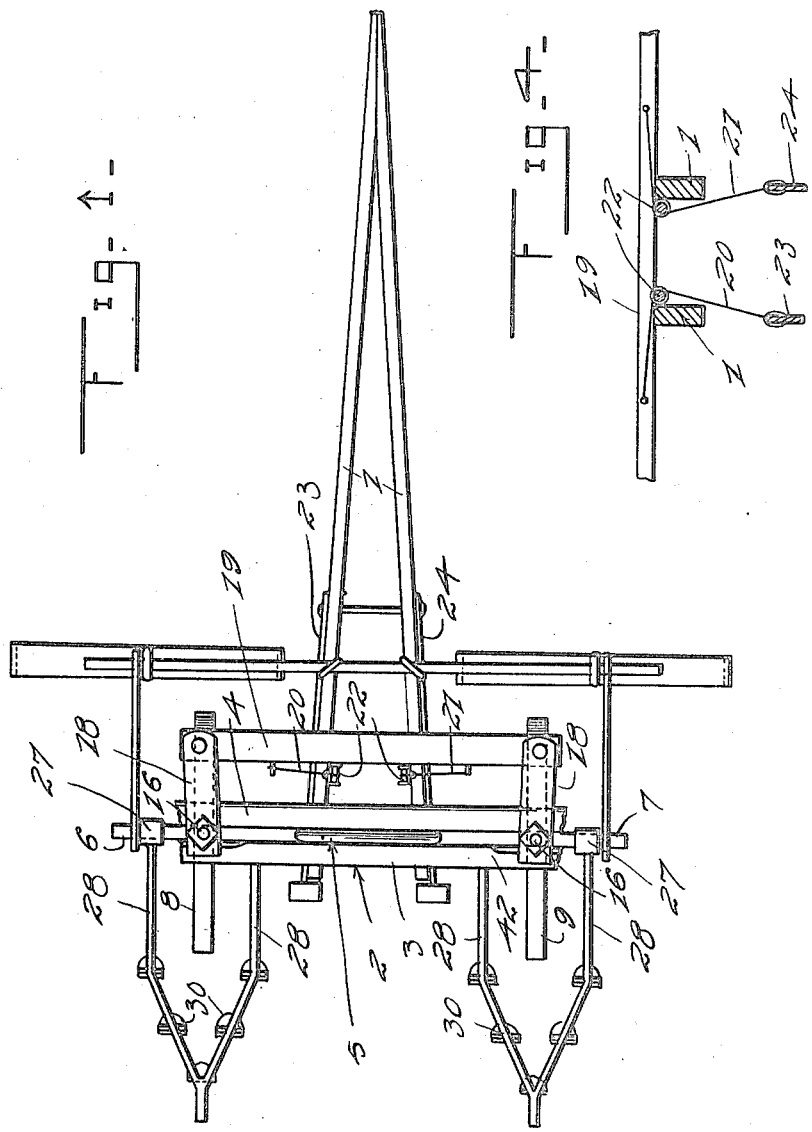

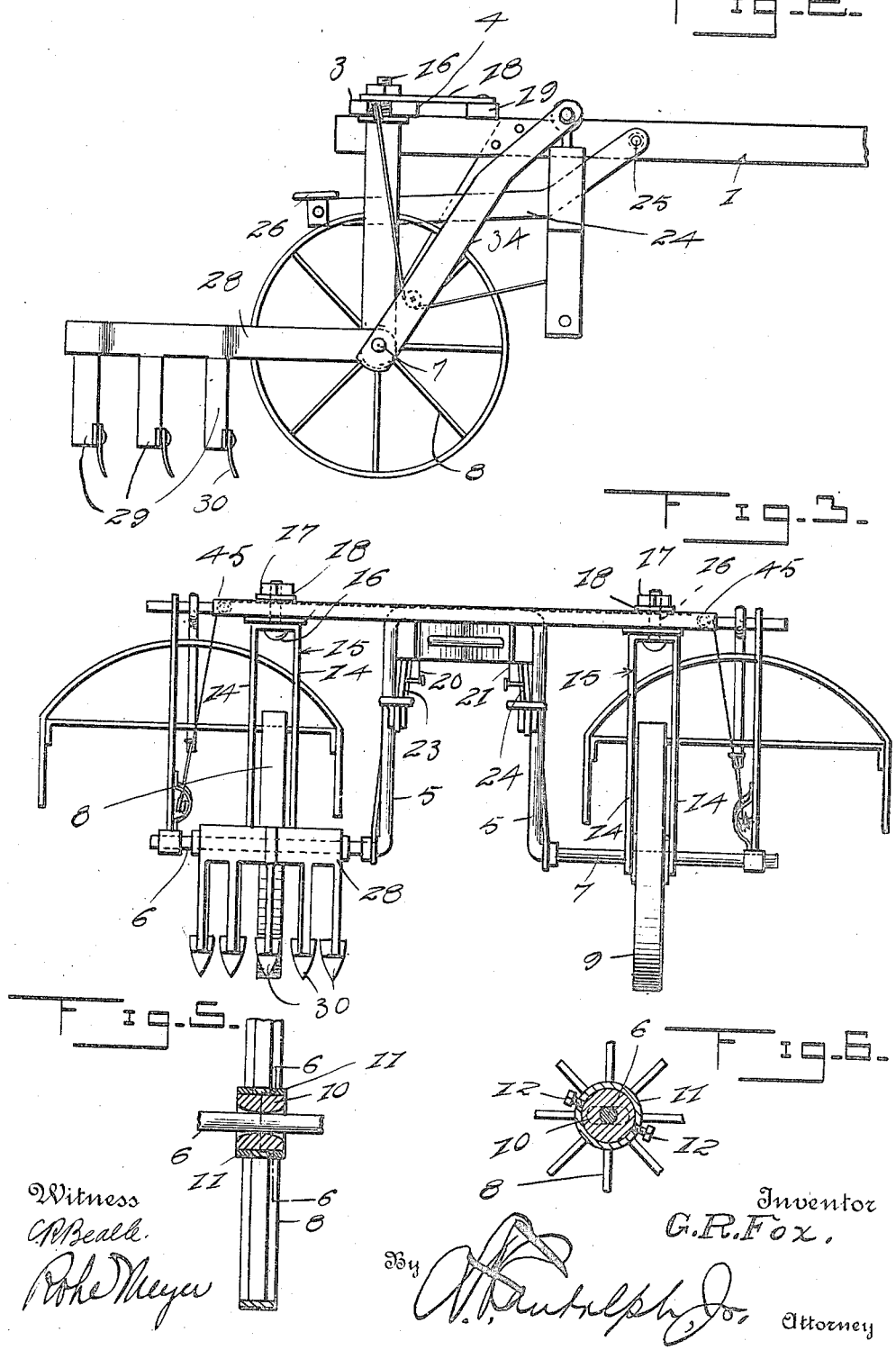

UNITED STATES PATENT OFFICE.

GEORGE R. FOX, OF PLEASANTON, NEBRASKA.

CULTIVATOR.

1,253,480.

Specification of Letters Patent.  Patented Jan. 15, 1918.

Application filed March 24, 1916. Serial No. 86,475.

*To all whom it may concern:*

Be it known that I, GEORGE R. FOX, a citizen of the United States, residing at Pleasanton, in the county of Buffalo and State of Nebraska, have invented certain new and useful Improvements in Cultivators; and I do hereby declare the following to be a full, clear, and exact description of the invention, such as will enable others skilled in the art to which it appertains to make and use the same.

This invention relates to cultivators and the primary object of the invention is to provide a two-row cultivator which is constructed for relieving the neck draft of the cultivator and also constructed so that the horses of a four horse team may be hitched in close proximity to each other, thereby permitting the operator of the cultivator to drive closer to a fence, than would otherwise be possible.

A further object of this invention is to provide a cultivator as specified which includes a pair of cultivator shovel supporting standards, the horizontal longitudinally extending arms of which are positioned in pairs, one of each pair being upon each side of the supporting wheels of the cultivator.

A still further object of this invention is to provide a cultivator structure as specified wherein the wheels of the cultivator are mounted for pivotal movement, for steering the cultivator and to provide means operable by the depression of foot levers for swinging the wheels for steering the cultivator.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a top plan view of the improved cultivator.

Fig. 2 is a side elevation of the cultivator.

Fig. 3 is a rear elevation of the cultivator.

Fig. 4 is a fragmentary view of the cultivator showing a part of the structure for regulating the position of the supporting wheels of the same for guiding the direction of travel of the cultivator.

Fig. 5 is a detail horizontal section showing the manner of mounting the wheels upon the axle, and Fig. 6 is a section on line 6—6 of Fig. 5.

Referring more particularly to the drawings, 1 designates the tongue of the cultivator which has a frame 2 connected to the rear end of the same. The frame 2 is composed of spaced bars 3 and 4 which extend transversely across the cultivator. An arch axle 5 is provided, which has its upper portion positioned between the bars 3 and 4. The arch axle 5 is provided with horizontal portions 6 and 7 formed upon its end, upon which horizontal portions are mounted supporting wheels 8 and 9. The supporting wheels 8 and 9 are rotatably mounted upon collars or hub members 10 and are held thereon against lateral movement by collars 11 through which set screws 12 extend and engage the hub members 10 for preventing lateral movement of the collars with respect to the hub members. The hub members 10 are provided with centrally disposed bores, which flare, in a horizontal plane, as shown in Fig. 5 of the drawings, so as to permit the hub members and consequently the supporting wheels carried thereby to be pivotally laterally of the direction of travel of the cultivator for steering the same. The hub members 10 have the legs 14 of substantially U-shaped members 15 connected thereto. The substantially U-shaped members 15 are pivotally connected to the bars 3 and 4 through the medium of bolts 16, which extend between the bars and are held in place by nuts 17 and washers 18 for pivotally supporting the U-shaped member 15.

Bars 18 are connected to the bolt 16, and to the ends of a bar 19 which is slidably mounted upon the upper edges of the tongue bars. Flexible members 20 and 21 are connected to the bar 19 upon opposite sides of its center, and they pass over pulleys 21 which are carried by the tongue structure 1. The flexible members 20 and 21 extend downwardly and are connected to foot levers 23 and 24 which are pivoted as shown at 25 to the tongue structure 1. Foot pedals 26 are mounted upon the rear end of the foot levers 23 and 24. When either of the foot levers 23 or 24 are depressed, they will through the medium of the flexible members 20 and 21 move the bar 19 longitudinally or transversely of the direction of the cultivator, which will move the bars 18 and consequently rock or partially rotate the bolt 16 which will in turn rotate the hub collars 10 and the wheels 9, for directing the direction of travel of the wheels for guiding the travel of the cultivator.

The horizontal portions 6 and 7 of the arch axle 5 have the collars 27 which are formed upon the forward edge of the longitudinal side bars 28 of the cultivator structure mounted thereon. The side bars 28 of the cultivator structure extend rearwardly and at their ends converge and connected to each other in any suitable manner. A plurality of cultivator shovel carrying standards 29 are connected to the side bars 28 at spaced intervals, and they have cultivating shovels 30 of the ordinary construction connected to their lower ends. The bars 28 are positioned upon opposite sides of the supporting wheels 8 and 9 of the cultivator structure as clearly shown in Fig. 1 of the drawings so that the shovels 30 which are carried thereby will cultivate two rows of growing grain at a time, one row of grain will be cultivated between the facing sides of the cultivator structures, while one-half of two rows upon the opposite sides or outer sides of the cultivator will be cultivated upon each trip of the cultivator.

From the foregoing description taken in connection with the accompanying drawings, the advantages of construction and of the method of operation of the improved cultivator will be readily apparent to those skilled in the art to which this invention appertains, and while in the foregoing description the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a cultivator structure, the combination, of a tongue, an arch axle carried by said tongue, hub collars mounted upon said arch axle for limited horizontal pivotal movement, supporting wheels rotatably mounted upon said hub collars, means for preventing movement of said supporting wheels longitudinally of said hub collars, a bar slidably mounted upon said tongue, foot levers pivotally connected to said tongue, means operatively connecting said foot levers to said bar for shifting said bar upon movement of said foot levers, and means operatively connecting said bar to said hub collars for pivotally moving said hub collars upon shifting of the bar for guiding the direction of travel of said supporting wheels.

2. In a cultivator structure, the combination of a tongue, an arch axle carried by said tongue, hub collars mounted upon said arch axle for limited horizontal pivotal movement, supporting wheels rotatably mounted upon said hub collars, means for preventing movement of said supporting wheels longitudinally of said hub collars, a bar slidably mounted upon said tongue, foot levers pivotally connected to said tongue, means operatively connecting said foot levers to said bar for shifting said bar upon movement of said foot levers, means operatively connecting said bar to said hub collars for swivelly moving said hub collars upon shifting of the bar for guiding the direction of travel of said supporting wheels, cultivating structures including side bars, said side bars being connected to said arch axle in pairs, one of each of said pairs of side bars being positioned upon each side of said supporting wheels, said side bars extending rearwardly and having their rear ends connected, and cultivating shovel carrying standards connected to said side bars.

In testimony whereof I affix my signature in presence of two witnesses.

GEORGE R. FOX.

Witnesses:
F. R. GILBERT,
F. A. MUELLER.

Copies of this patent may be obtained for five cents each, by addressing the "Commissioner of Patents, Washington, D. C."